J. M. WALKER.
FERTILIZER DISTRIBUTER.
APPLICATION FILED OCT. 31, 1914.
1,151,426.
Patented Aug. 24, 1915.
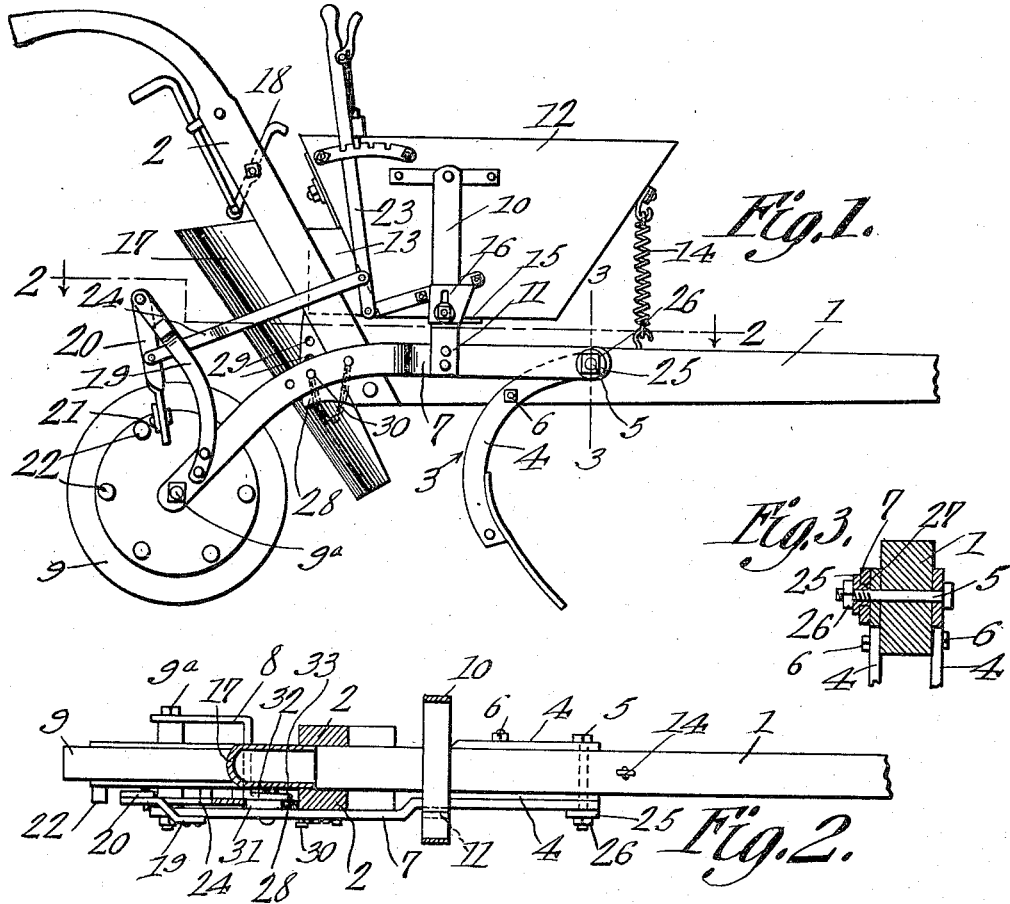
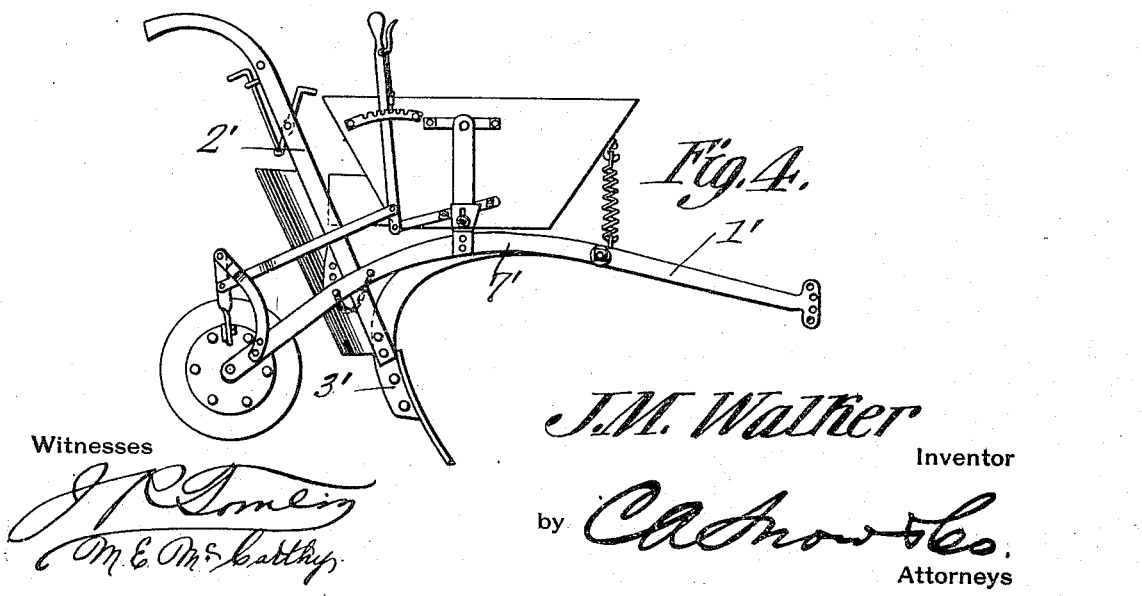
Witnesses
Inventor
J. M. Walker
by
Attorneys

UNITED STATES PATENT OFFICE.

JAMES MONROE WALKER, OF CARROLLTON, GEORGIA.

FERTILIZER-DISTRIBUTER.

1,151,426.  Specification of Letters Patent.  Patented Aug. 24, 1915.

Application filed October 31, 1914. Serial No. 869,599.

*To all whom it may concern:*

Be it known that I, JAMES M. WALKER, a citizen of the United States, residing at Carrollton, in the county of Carroll and State of Georgia, have invented a new and useful Fertilizer-Distributer, of which the following is a specification.

The present invention appertains to fertilizer distributers, and is particularly an improvement over the fertilizer distributer disclosed in my former Patent No. 1,090,356, issued March 17, 1914.

This invention contemplates the provision of a fertilizer distributer embodying a frame including a stock or beam, and a distributing device or mechanism proper, which is detachably carried by the stock or beam, in order that the said device or mechanism may be detached and the frame employed as a plow or cultivator.

It is also within the scope of the invention, to provide a fertilizer distributer or mechanism which may be readily attached to the stock or beam of various plow structures, to eliminate the necessity of a special or independent frame for the distributing apparatus, and whereby when the distributing apparatus is not in use, the frame may be used separately as a plow or cultivator.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention has been illustrated in its preferred embodiment in the accompanying drawing, wherein:—

Figure 1 is a side elevation of the distributer, a portion of the stock or beam being broken away. Fig. 2 is a sectional view taken on the line 2—2 of Fig. 1. Fig. 3 is an enlarged cross sectional detail taken on the line 3—3 of Fig. 1. Fig. 4 is a side elevation illustrating the distributing device applied to another form of stock or beam.

In the drawing, there is illustrated a frame embodying the wooden beam or stock 1, having the handles 2 attached to the rear end thereof, and carrying the plow foot 3. The plow foot 3 embodies the arcuate bars 4 having their upper end portions attached to the sides of the beam or stock 1, by means of bolts 5 and 6 engaged through the bars and beam.

The present attachment is applied to one side of the frame, and embodies a secondary or supplemental beam 7 having its forward end pivotally engaged to the corresponding end portion of the bolt 5, and having its rear end portion curved downwardly, the beam or bar 7 being disposed at one side of the main beam or stock 1. An angular bracket 8 has one end secured to the beam 7 adjacent the rear end of the said beam, and forms a fork with the rear end portion of the beam 7, within which fork is mounted for rotation, the trailer wheel 9 having its axle $9^a$ engaged to the terminals of the beam 7 and bracket 8. Thus, the beam 7, which is disposed at the side of the frame, will have the fork in rear of the beam or stock 1 and projecting or offset to the other side, in order that the wheel 9 will lie in the median plane of the structure.

A U-shaped bracket 10 is carried by the beam 7 intermediate the ends thereof, above the beam 1 and in advance of the handles 2, the lower portion of the bracket 10 having a depending shank 11 adjacent one side portion or arm of the bracket 10, and the shank 11 is rigidly secured to the beam 7, whereby the bracket 10 will project over the beam 1 toward the other side, to support a hopper 12 in proper position above the beam or stock 1. The hopper 12 is disposed between the arms of the bracket 10, and has its sides trunnioned or fulcrumed to the upper ends of the said arms, whereby the hopper may oscillate about a transverse axis. The hopper 12 is provided with a rear outlet or discharge means 13 through which the fertilizer contained in the hopper may be discharged when the hopper is oscillated or vibrated.

The front end of the hopper 12 is connected by means of a retractile coiled wire spring 14 with the beam or stock 1, to yieldably swing the front end of the hopper downwardly. In order to limit the downward movement of the forward end of the hopper, a cross strip 15 is secured to the bottom of the hopper and is adapted to contact with the arms of the bracket 10, to this end, an adjustable stop 16 being carried by one arm of the bracket 10 for the engagement of the strip 15, in order that the movement of the hopper may be regulated. A discharge boot 17 is secured to the handles 2 in rear of the outlet or discharge means 13 of the hopper, to receive the discharged fertilizer, and deliver the same into the furrow in rear of the plow foot 3. A latch 18 is also carried by the handles 2, and is engageable with the rear end of the hopper 12, when the rear end of the hopper is swung downwardly, to hold the hopper in idle or inoperative position.

The device for vibrating the hopper, embodies a bracket or bar 19 secured to the rear end portion of the beam 7 and projecting upwardly therefrom, and a trip lever 20 fulcrumed to the upper end of the bracket 19 and projecting downwardly therefrom, a shoe 21 being secured to the lower or free end of the lever 20 for engaging an annular series of lugs or pins 22 projecting from one side of the wheel 9. An adjustable lever 23 is fulcrumed to the corresponding side of the hopper 12, adjacent the rear end of the hopper, and a link 24 connects the levers 20 and 23, whereby when the trip lever 20 is vibrated by the engagement of the lugs 22 therewith as the wheel 9 is rotated, the link 24 will impart an oscillatory or vibratory movement to the hopper 12, since the lever 23 is normally fixed with respect to the hopper, although the lever 23 may be adjusted to vary the throw or movement of the hopper.

As a means for journaling the beam 7 to the bolt 5, to reduce the friction of the beam 7 in oscillating, a washer 25 is mounted upon the bolt 5 between the beam 7 and the nut 26 threaded upon the respective end of the said bolt, and the washer 25 is provided with a boss 27 fitting within the aperture provided in the forward end of the beam 7. Thus, when the nut 26 is tightened, the washer 25 and its boss 27 will take up the strain, and will prevent the beam 7 from being clamped, so that the beam 7 may readily oscillate or vibrate upon the boss 27.

As a means for adjustably locking the beam 7 at various angles with respect to the beam or stock 1, a plate 28 is secured to the respective handle 2 and projects rearwardly therefrom adjacent the lower end thereof, the plate 28 being provided with an arcuate series of apertures 29, and a locking pin 30 being engageable through the beam 7 and into one of the apertures 29. A shin plate 31 is sandwiched between the beam 7 and the end 32 of the bracket 8 which is secured to the said beam, to space the said end portion 32 of the bracket from the beam, the said end portion 32 of the bracket being provided with a projection or tongue 33 overlapping the inner side of the plate 28. Thus, the beam 7 resting against the outer side of the plate 28, and the tongue or extension 33 engaging the inner side of the said plate, will properly guide the beam 7 for vertical movement.

The cardinal or salient feature of the invention, resides in the fact that the beam 7 may be readily applied to and detached from the beam or stock 1, by simply removing the nut 26 and washer 25, so that when the distributing mechanism is not in use, the same may be readily detached from the frame, so that the frame may be employed independently as a plow or cultivator.

From the foregoing, it is evident that when the distributer is in operation, the rotation of the wheel 9 will vibrate the trip lever 20, to oscillate the hopper 12 so as to discharge the fertilizer into the boot or chute 17. The trip lever 20 being forced forwardly by the lugs or pins 22 of the wheel 9, will swing the hopper 12 against the tension of the spring 14, so that when the lever 20 is released from the successive lugs 22, the spring 14 will return the hopper.

The distributer mechanism embodying the supplemental beam 7 and parts carried thereby, can also be readily applied to various plow frames, it being noted that when the beam 7 is fulcrumed to the beam or stock of the plow, the hopper 12 and wheel 9 will be properly positioned in the median plane of the plow frame, due to the peculiar construction of the several parts.

As illustrated in Fig. 4, the distributer mechanism is applied to an iron plow beam or stock 1' having its rear end portion curved downwardly to provide the plow foot 3', the handles 2' being attached to the plow foot 3', and the beam 7' of the distributer mechanism being fulcrumed to the beam 1', in precisely the same manner as illustrated in Fig. 3.

Having thus described the invention, what is claimed as new is:—

A fertilizer distributer embodying a stock, handles attached to the rear end thereof, a beam fulcrumed to the stock, a wheel carried by the rear end of the beam, a bracket carried by the beam, a hopper fulcrumed to the bracket, an actuating device operably connecting the said wheel and hopper, a rearwardly projecting plate secured to one handle adjacent the said beam, the beam working against the outer face of the said plate and having means overlapping the inner face of the said plate.

In testimony that I claim the foregoing as my own, I have hereto affixed my signature in the presence of two witnesses.

JAMES MONROE WALKER.

Witnesses:
I. C. LOFTIN,
J. A. TANNER.

Copies of this patent may be obtained for five cents each, by addressing the "Commissioner of Patents, Washington, D. C."